United States Patent
Yu

(10) Patent No.: US 10,390,278 B2
(45) Date of Patent: Aug. 20, 2019

(54) METHOD FOR AUTOMATIC SWITCHING BETWEEN ACCESS POINTS, AND WIRELESS ROUTING DEVICE

(71) Applicant: Huawei Technologies Co., Ltd., Shenzhen (CN)

(72) Inventor: Shangchun Yu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/560,860

(22) PCT Filed: Mar. 24, 2015

(86) PCT No.: PCT/CN2015/074969
§ 371 (c)(1),
(2) Date: Sep. 22, 2017

(87) PCT Pub. No.: WO2016/149911
PCT Pub. Date: Sep. 29, 2016

(65) Prior Publication Data
US 2018/0124669 A1 May 3, 2018

(51) Int. Cl.
| | | |
|---|---|---|
| *H04W 36/16* | (2009.01) | |
| *H04W 48/16* | (2009.01) | |
| *H04W 8/00* | (2009.01) | |
| *H04W 36/00* | (2009.01) | |
| *H04W 36/08* | (2009.01) | |
| *H04W 36/36* | (2009.01) | |
| *H04W 84/12* | (2009.01) | |

(52) U.S. Cl.
CPC ........... *H04W 36/16* (2013.01); *H04W 8/005* (2013.01); *H04W 36/0088* (2013.01); *H04W 36/08* (2013.01); *H04W 36/36* (2013.01); *H04W 48/16* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2005/0108431 A1 | 5/2005 | Park | |
| 2006/0193258 A1* | 8/2006 | Ballai | H04L 63/10 370/230 |

(Continued)

FOREIGN PATENT DOCUMENTS

| | | |
|---|---|---|
| CN | 103369633 A | 10/2013 |
| CN | 104202737 A | 12/2014 |

(Continued)

OTHER PUBLICATIONS

Machine Translation and Abstract of Chinese Publication No. CN103369633, Oct. 23, 2013, 18 pages.

(Continued)

*Primary Examiner* — Christine T Duong
(74) *Attorney, Agent, or Firm* — Conley Rose, P.C.

(57) ABSTRACT

A method for automatic switching between access points and a wireless routing device. In the embodiments of the present disclosure, a wireless routing device determines whether an access point device allowing access exists, and if the access point device exists, the wireless routing device establishes a connection to the access point device and disconnects from a terminal.

17 Claims, 3 Drawing Sheets

(56) References Cited

U.S. PATENT DOCUMENTS

| | | | |
|---|---|---|---|
| 2008/0320108 A1* | 12/2008 | Murty | H04W 48/20 |
| | | | 709/220 |
| 2011/0149928 A1 | 6/2011 | Wu et al. | |
| 2013/0272269 A1* | 10/2013 | Srivastava | H04W 36/30 |
| | | | 370/332 |
| 2013/0297754 A1 | 11/2013 | Wentink | |
| 2014/0075011 A1 | 3/2014 | Salkintzis | |
| 2014/0250513 A1* | 9/2014 | Cao | H04L 63/08 |
| | | | 726/7 |

FOREIGN PATENT DOCUMENTS

| | | | |
|---|---|---|---|
| JP | 2003174449 A | 6/2003 | |
| JP | 2007509566 A | 4/2007 | |
| JP | 2011029985 A | 2/2011 | |
| JP | 2013207313 A | 10/2013 | |
| WO | 2014116526 A1 | 7/2014 | |

OTHER PUBLICATIONS

Machine Translation and Abstract of Chinese Publication No. CN104202737, Dec. 10, 2014, 6 pages.

Foreign Communication From a Counterpart Application, PCT Application No. PCT/CN2015/074969, English Translation of International Search Report dated Dec. 31, 2015, 2 pages.

Foreign Communication From a Counterpart Application, PCT Application No. PCT/CN2015/074969, English Translation of Written Opinion dated Dec. 31, 2015, 7 pages.

Machine Translation and Abstract of Japanese Publication No. JP2013207313, Oct. 7, 2013, 18 pages.

Foreign Communication From a Counterpart Application, European Application No. 15885850.6, Extended European Search Report dated Dec. 18, 2017, 11 pages.

Machine Translation and Abstract of Japanese Publication No. JP2003174449, Jun. 20, 2003, 16 pages.

Machine Translation and Abstract of Japanese Publication No. JP2011029985, Feb. 10, 2011, 29 pages.

Foreign Communication From a Counterpart Application, Japanese Application No. 2017-549810, Japanese Office Action dated Oct. 23, 2018, 5 pages.

Foreign Communication From a Counterpart Application, Japanese Application No. 2017-549810, English Translation of Japanese Office Action dated Oct. 23, 2018, 6 pages.

* cited by examiner

METHOD FOR AUTOMATIC SWITCHING BETWEEN ACCESS POINTS, AND WIRELESS ROUTING DEVICE

CROSS-REFERENCE TO RELATED APPLICATIONS

This application is a national stage of International Application No. PCT/CN2015/074969, filed on Mar. 24, 2015, which is hereby incorporated by reference in its entirety

TECHNICAL FIELD

Embodiments of the present disclosure relate to communications technologies, and in particular, to a method for automatic switching between access points, and a wireless routing device.

BACKGROUND

A wireless local area network (WLAN) is a network in which communication is performed by means of wireless media. The WLAN is a combination of a computer network and communications technologies, and generally includes devices such as an access point (AP) and a station (STA). The STA is also referred to as a terminal or an access device.

The access point may be connected to a wireless network, or may be connected to a wired network. The access point may also be referred to as a hotspot. A hotspot covered by a wireless local area network used at home is referred to as a home hotspot. The home hotspot (including a client device having a wireless fidelity (WiFi) AP function) performs uplink transmission by using the Ethernet, and is fixedly disposed at home as an ingress of the Internet. Therefore, the home hotspot is not portable. A mobile hotspot, for example, mobile WiFi, is mainly used to provide outdoor wireless local area network coverage. The mobile hotspot is portable and can perform high-speed data services by using the 4th-generation mobile telecommunications technology (4G)/3rd-generation mobile telecommunications technology (3G)/2nd-generation wireless telephone technology (2G).

A growing quantity of user terminals can access the Internet by using the foregoing two access points, so as to implement services such as web browsing, data transmission, or a voice call. Generally, if a terminal is outside a coverage area of a wireless local area network at home, the terminal can access the Internet by using a mobile hotspot. When the terminal is within the coverage area of the wireless local area network at home, the terminal can access the Internet by using a home hotspot. However, when the terminal device moves into the coverage area of the wireless local area network at home from outside of the coverage area of the wireless local area network at home, the terminal is still connected to the mobile hotspot outside the coverage area of the wireless local area network at home and cannot automatically switch to the home hotspot. To implement the switching, a user has to manually disable the mobile hotspot and connect to the home hotspot, or has to manually scan for other hotspots on the terminal and then disconnect the terminal from the mobile hotspot and connect to the home hotspot. It can be learned that, a terminal cannot perform automatic switching within a coverage area of a wireless local area network at home by using the foregoing technology.

SUMMARY

Embodiments of the present disclosure provide a method for automatic switching between access points, and a wireless routing device, so as to implement automatic switching of a terminal between access points.

According to a first aspect, an embodiment of the present disclosure provides a method for automatic switching between access points, where when a wireless routing device has established a network connection to a terminal, the method includes determining, by the wireless routing device, whether an access point device allowing access exists within a wireless connection range of the wireless routing device; sending, by the wireless routing device if the access point device exists, a wireless connection request message to the access point device, to establish a network connection to the access point device; and disrupting, by the wireless routing device, the network connection to the terminal, to trigger the terminal to connect to the access point device, so that the terminal accesses the Internet by using the access point device.

With reference to the first aspect, in a first possible implementation of the first aspect, the determining, by the wireless routing device, whether an access point device allowing access exists within a wireless connection range of the wireless routing device includes working, by the wireless routing device, in an access point AP function plus station STA function mode, periodically scanning for an access point device by using the STA, obtaining a service set identifier of the found access point device, and comparing the service set identifier of the access point device with an access point device service set identifier set stored in the access point device, to determine whether the access point device is the access point device allowing access; and if the service set identifier of the access point device is in the service set identifier set stored in the access point device, determining that the access point device is the access point device allowing access, where the service set identifier set stored in the access point device includes a service set identifier of at least one access point device.

With reference to the first aspect or the first possible implementation of the first aspect, in a second possible implementation of the first aspect, before the sending, by the wireless routing device if the access point device exists, a wireless connection request message to the access point device, to establish a network connection to the access point device, the method further includes sending, by the wireless routing device, a Dynamic Host Configuration Protocol DHCP discover message to the access point device, where the DHCP discover message carries a first DHCP option field; receiving, by the wireless routing device, a DHCP suggestion message returned by the access point device, where the DHCP suggestion message carries a second DHCP option field; and comparing, by the wireless routing device, the first DHCP option field with the second DHCP option field, and if the first DHCP option field is consistent with the second DHCP option field, establishing the connection to the access point device.

With reference to any one of the first aspect, or the first or the second possible implementation of the first aspect, in a third possible implementation of the first aspect, the disrupting, by the wireless routing device, the network connection to the terminal includes stopping, by the wireless routing device, wirelessly communicating with the terminal; or sending, by the wireless routing device, a de-associate message to the terminal, and hiding a service set identifier of the wireless routing device.

With reference to any one of the first aspect, or the first to the third possible implementations of the first aspect, in a fourth possible implementation of the first aspect, after the disrupting, by the wireless routing device, the connection to the terminal, the method further includes disconnecting, by the wireless routing device, from a wireless wide area network.

With reference to any one of the first aspect, or the first to the fourth possible implementations of the first aspect, in a fifth possible implementation of the first aspect, after the disrupting, by the wireless routing device, the network connection to the terminal, the method further includes switching, by the wireless routing device, from the access point AP function plus station STA function mode to a station STA function mode; and monitoring, by the wireless routing device, the access point device continuously in the station STA function mode.

With reference to the fifth possible implementation of the first aspect, in a sixth possible implementation of the first aspect, the monitoring, by the wireless routing device, the access point device continuously in the station STA function mode includes if the wireless routing device detects that the wireless routing device is disconnected from the access point device, switching, by the wireless routing device, back to the access point AP function plus station STA function mode to reestablish a network connection to the terminal.

According to a second aspect, an embodiment of the present disclosure provides a wireless routing device, where when the wireless routing device has established a network connection to a terminal, the wireless routing device includes a processing module configured to determine whether an access point device allowing access exists within a wireless connection range of the wireless routing device; and a sending module configured to if the access point device exists, send a wireless connection request message to the access point device, to establish a network connection to the access point device, where the processing module is further configured to disrupt the network connection to the terminal, to trigger the terminal to connect to the access point device, so that the terminal accesses the Internet by using the access point device.

With reference to the second aspect, in a first possible implementation of the second aspect, that the processing module is configured to determine whether an access point device allowing access exists within a wireless connection range of the wireless routing device includes working, by the processing module, in an access point AP function plus station STA function mode, periodically scanning for an access point device by using the STA, obtaining a service set identifier of the found access point device, and comparing the service set identifier of the access point device with an access point device service set identifier set stored in the access point device, to determine whether the access point device is the access point device allowing access; and if the service set identifier of the access point device is in the service set identifier set stored in the access point device, determining that the access point device is the access point device allowing access, where the service set identifier set stored in the access point device includes a service set identifier of at least one access point device.

With reference to the second aspect or the first possible implementation of the second aspect, in a second possible implementation of the second aspect, the sending module is further configured to before the network connection to the access point device is established, send a DHCP discover message to the access point device, where the DHCP discover message carries a first DHCP option field; the wireless routing device further includes a receiving module configured to receive a DHCP suggestion message returned by the access point device, where the DHCP suggestion message carries a second DHCP option field; and the processing module is further configured to compare the first DHCP option field with the second DHCP option field, and if the first DHCP option field is consistent with the second DHCP option field, establish the connection to the access point device.

With reference to any one of the second aspect, or the first or the second possible implementation of the second aspect, in a third possible implementation of the second aspect, that the processing module is configured to disrupt the network connection to the terminal includes stopping wirelessly communicating with the terminal; or sending a de-associate message to the terminal, and hiding a service set identifier of the wireless routing device.

With reference to any one of the second aspect, or the first to the third possible implementations of the second aspect, in a fourth possible implementation of the second aspect, after the processing module is configured to disrupt the network connection to the terminal, the processing module is further configured to disconnect from a wireless wide area network.

With reference to any one of the second aspect, or the first to the fourth possible implementations of the second aspect, in a fifth possible implementation of the second aspect, the processing module is further configured to after disrupting the network connection to the terminal, switch from the access point AP function plus station STA function mode to a station STA function mode; and monitor the access point device continuously in the station STA mode.

With reference to the fifth possible implementation of the second aspect, in a sixth possible implementation of the second aspect, that the processing module is configured to monitor the access point device continuously in the station STA function mode includes if the processing module detects that the wireless routing device is disconnected from the access point device, switching back to the access point AP function plus station STA function mode to reestablish a network connection to the terminal.

According to a third aspect, an embodiment of the present disclosure provides a wireless routing device, where when the wireless routing device has established a network connection to a terminal, the wireless routing device includes a processor configured to determine whether an access point device allowing access exists within a wireless connection range of the wireless routing device; and a transmitter configured to if the access point device exists, send a wireless connection request message to the access point device, to establish a network connection to the access point device, where the processor is further configured to disrupt the network connection to the terminal, to trigger the terminal to connect to the access point device, so that the terminal accesses the Internet by using the access point device.

With reference to the third aspect, in a first possible implementation of the third aspect, that the processor is configured to determine whether an access point device allowing access exists within a wireless connection range of the wireless routing device includes in an access point AP function plus station STA function mode, periodically scanning, by the processor, for an access point device by using the STA, obtaining a service set identifier of the found access point device, and comparing the service set identifier of the access point device with an access point device service set identifier set stored in the access point device, to determine whether the access point device is the access point device allowing access; and if the service set identifier of the access point device is in the service set identifier set stored in the access point device, determining that the access point device is the access point device allowing access, where the service set identifier set stored in the access point device includes a service set identifier of at least one access point device.

With reference to the third aspect or the first possible implementation of the third aspect, in a second possible implementation of the third aspect, the wireless routing device further includes a receiver; and before the wireless routing device establishes the network connection to the access point device, the transmitter sends a DHCP discover message to the access point device, where the DHCP discover message carries a first DHCP option field; the receiver receives a DHCP suggestion message returned by the access point device, where the DHCP suggestion message carries a second DHCP option field; and the processor is further configured to compare the first DHCP option field with the second DHCP option field, and if the first DHCP option field is consistent with the second DHCP option field, establish the connection to the access point device.

With reference to any one of the third aspect, or the first or the second possible implementation of the third aspect, in a third possible implementation of the third aspect, that the processor is configured to disrupt the network connection to the terminal includes stopping wirelessly communicating with the terminal; or sending a de-associate message to the terminal, and hiding a service set identifier of the wireless routing device.

With reference to any one of the third aspect, or the first to the third possible implementations of the third aspect, in a fourth possible implementation of the third aspect, the processor is further configured to disconnect from a wireless wide area network after disrupting the network connection to the terminal.

With reference to any one of the third aspect, or the first to the fourth possible implementations of the third aspect, in a fifth possible implementation of the third aspect, the processor is further configured to after disrupting the network connection to the terminal, switch from the access point AP function plus station STA function mode to a station STA function mode; and monitor the access point device continuously in the station STA mode.

With reference to the fifth possible implementation of the third aspect, in a sixth possible implementation of the third aspect, that the processor monitors the access point device continuously in the station STA mode includes if the processor detects that the wireless routing device is disconnected from the access point device, switching back to the access point AP function plus station STA function mode to reestablish a network connection to the terminal.

According to the method for automatic switching between access points, and the wireless routing device in the embodiments of the present disclosure, a wireless routing device determines whether an access point device allowing access exists within a wireless connection range of the wireless routing device, and if the access point device allowing access exists, the wireless routing device establishes a network connection to the access point device and disrupts a network connection to a terminal, so that the terminal connects to the access point device and accesses the Internet by using the access point device. In this way, the terminal automatically switches between access points.

BRIEF DESCRIPTION OF DRAWINGS

To describe the technical solutions in the embodiments of the present disclosure or in some approaches more clearly, the following briefly describes the accompanying drawings for describing the embodiments or some approaches. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, access points are classified into a fixed access point and a mobile access point. The fixed access point is an access point that is fixedly disposed indoors as a network ingress for a terminal to access a network. The fixed access point may be used by terminals used by fixed users to access a network, and may be a home hotspot covered by a home wireless local area network, a hotspot covered by an enterprise wireless local area network, or the like. The mobile access point is a portable access point that performs high-speed data services by using 4G\3G\2G. Outside a coverage area of a fixed access point, a terminal used by a user can still access a network by using a mobile access point, for example, a wireless routing device. The mobile access point may be mobile WiFi or the like.

Figure 1:
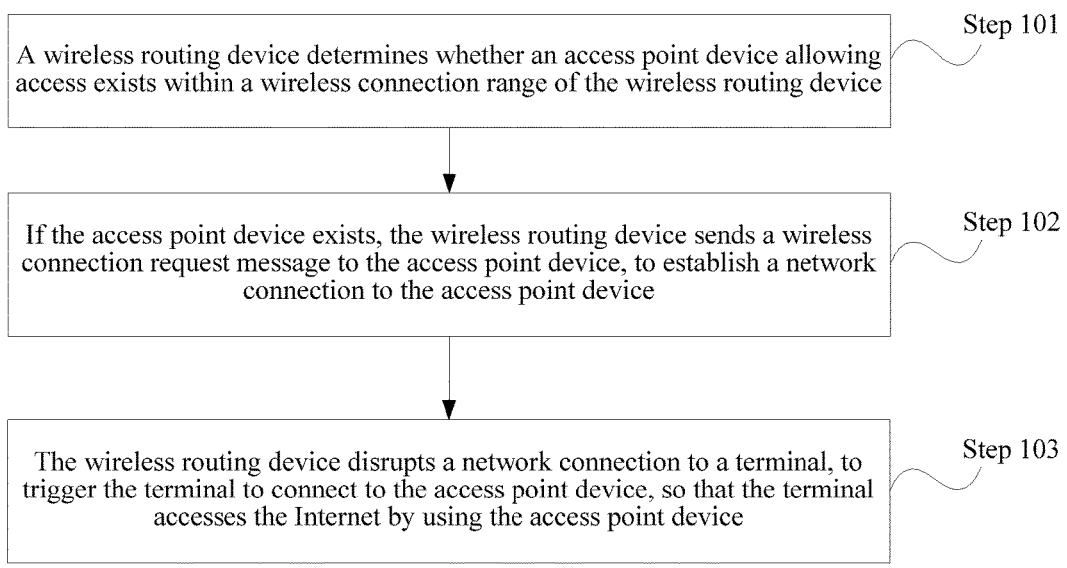
FIG. 1 is a flowchart of Embodiment 1 of a method for automatic switching between access points according to the present disclosure.

FIG. 1 is a flowchart of Embodiment 1 of a method for automatic switching between access points according to the present disclosure. In this embodiment, a wireless routing device is a mobile access point, and an access point device is a fixed access point. This embodiment is executed by the wireless routing device, and an implementation scenario of this embodiment is that the wireless routing device has established a network connection to a terminal. As shown in FIG. 1, the method in this embodiment may include the following steps.

Step 101 The wireless routing device determines whether an access point device allowing access exists within a wireless connection range of the wireless routing device.

The wireless connection range of the wireless routing device refers to an effective working distance of the wireless routing device, or may be understood as a signal coverage area of the wireless routing device. The wireless routing device may discover another access point device within the wireless connection range of the wireless routing device, or may be discovered by a terminal within the wireless connection range of the wireless routing device so that the terminal establishes a network connection to the wireless routing device.

Step 102 If the access point device exists, the wireless routing device sends a wireless connection request message to the access point device, to establish a network connection to the access point device.

The access point device receives the wireless connection request message sent by the wireless routing device, and returns a wireless connection response message to the wireless routing device according to the wireless connection request message, so that the wireless routing device establishes the connection to the access point device.

Step 103 The wireless routing device disrupts the network connection to the terminal, to trigger the terminal to connect to the access point device, so that the terminal accesses the Internet by using the access point device.

After the wireless routing device establishes the connection to the access point device in step 102, the wireless routing device disconnects from the terminal. There may be one or more terminals. The terminal has automatic scanning and reconnection functions, and automatically scans for another access point device if disconnected from the wireless routing device. When finding a previously connected access point device, the terminal reconnects to the access point device, to connect to a network by using the access point device, thereby implementing Internet access. For example, a mobile phone of a user is used as the terminal, a home hotspot is used as the access point device, and a mobile hotspot is used as the wireless routing device. The mobile phone of the user may use the home hotspot to connect to a network at home and uses, outside a coverage area of the home hotspot, the mobile hotspot to connect to a network. According to the method in this embodiment, when finding the home hotspot allowing access, the mobile hotspot establishes a connection to the home hotspot, and disrupts a connection to the mobile phone after successfully establishing the connection, so that the mobile phone reconnects to the home hotspot, thereby implementing automatic switching between the access points.

Optionally, that the wireless routing device determines whether an access point device allowing access exists within a wireless connection range of the wireless routing device may be working, by the wireless routing device, in an access point AP function plus station STA function mode, periodically scanning for an access point device by using the STA, obtaining a service set identifier of the found access point device, and comparing the service set identifier of the access point device with an access point device service set identifier set stored in the access point device, to determine whether the access point device is the access point device allowing access; and if the service set identifier of the access point device is in the service set identifier set stored in the access point device, determining that the access point device is the access point device allowing access. The service set identifier set stored in the access point device includes a service set identifier of at least one access point device.

In the access point AP function plus station STA function mode, the wireless routing device has an AP function plus a STA function. The AP function means that the wireless routing device can be scanned by and connected to a terminal and can manage a terminal connected to the wireless routing device. The STA function means that the wireless routing device can scan for and connect to another access point device. That is, in the AP function plus STA function mode, the wireless routing device can be scanned by and connected to a terminal, can manage a terminal connected to the wireless routing device, and can scan for and connect to another access point device.

The wireless routing device can periodically scan for an access point device neighboring to the wireless routing device. A period may be flexibly set according to a requirement. After the wireless routing device finds an access point device, the wireless routing device obtains a service set identifier of the access point device, and compares the service set identifier of the access point device with an access point device service set identifier set stored in the access point device, to determine whether the access point device is the access point device allowing access. When the access point device is the access point device allowing access, step 102 and step 103 are performed. When the access point device is not the access point device allowing access, the wireless routing device continues to perform periodic scanning, and maintains the connection to the terminal.

Optionally, if the access point device exists, before the wireless routing device sends the wireless connection request message to the access point device, to establish the network connection to the access point device, the wireless routing device may further send a DHCP discover message to the access point device. The DHCP discover message carries a first DHCP option field. The wireless routing device receives a DHCP suggestion message returned by the access point device. The DHCP suggestion message carries a second DHCP option field. The wireless routing device compares the first DHCP option field with the second DHCP option field, and if the first DHCP option field is consistent with the second DHCP option field, establishes the connection to the access point device. Secondary auxiliary identification is performed according to this method. That is, whether the access point device is the access point device allowing access is first determined in step 101. If the access point device is the access point device allowing access, the foregoing secondary auxiliary identification may be further performed before the wireless routing device establishes the connection to the access point device. A secure access can be implemented by performing secondary identification on the found access point device.

Further, an implementation of disrupting the network connection to the terminal by the wireless routing device in step 103 may be sending, by the wireless routing device, a de-associate message to the terminal, and hiding a service set identifier (SSID) of the wireless routing device, so as to control access of the terminal. Certainly, it can be understood that in step 103, the wireless routing device may disrupt the connection to the terminal in another manner. For example, the wireless routing device stops wirelessly communicating with the terminal. That is, the wireless routing device disables the AP function of the wireless routing device. In other words, the wireless routing device stops being scanned by and connected to the terminal, and stops managing the terminal connected to the wireless routing device.

Further, after the wireless routing device disrupts the network connection to the terminal, the wireless routing device disconnects from a wireless wide area network, and may disconnect from a 3GPP or 3GPP2 wireless wide area network, so as to effectively reduce power consumption of a first access point and prolong a service time of the wireless routing device. It should be noted that the wireless wide area network in this embodiment is different from the Internet in this embodiment, and may be a wireless network provided by using a mobile communications technology such as 4G/3G/2G. The first access point that provides Internet access by using the wireless wide area network needs to transmit data by using a base station and a core network in sequence to the Internet to implement access. The access point device in this embodiment may directly connect to the Internet by using a switching device. Services such as communication and resource sharing can be provided to an access device by using the Internet. For example, video or audio data resources are provided to the terminal.

Further, after the wireless routing device disrupts the network connection to the terminal, the wireless routing device switches from the access point AP function plus station STA function mode to a station STA function mode, and the wireless routing device monitors the access point device continuously in the station STA function mode. That is, after the wireless routing device disrupts the connection to the terminal, the wireless routing device enters the STA function mode.

Further, when the wireless routing device works in the STA function mode, the wireless routing device monitors a status of the connection between the wireless routing device and the access point device. If the wireless routing device detects that the wireless routing device is disconnected from the access point device, the wireless routing device switches back to the access point AP function plus station STA function mode to reestablish a network connection to the terminal. That is, when the access point device cannot work normally, the access point device disconnects from the wireless routing device because an upper access limit is reached, the access point device disconnects from the wireless routing device because load is limited, a data link between the wireless routing device and the access point device is unavailable for a long time, or the wireless routing device moves into an area that cannot be covered by the access point device, the wireless routing device is disconnected from the access point device. When the wireless routing device detects the disconnection, the wireless routing device switches back to the access point AP function plus station STA function mode. In the access point AP function plus station STA function mode, the wireless routing device can be automatically found by the terminal so that the terminal establishes a connection to the wireless routing device. In this way, the terminal can still access the network.

It should be noted that in step 103, the wireless routing device disrupts the network connection to the terminal, so that the terminal connects to the access point device. Herein, it is not the first time that the terminal connects to the access point device. That is, the terminal has stored a WiFi connection password of the access point device, and can automatically connect to the access point device.

In this embodiment, a wireless routing device determines whether an access point device allowing access exists within a wireless connection range of the wireless routing device, and if the access point device allowing access exists, the wireless routing device establishes a network connection to the access point device and disrupts a network connection to a terminal, so that the terminal connects to the access point device and accesses the Internet by using the access point device. In this way, the terminal automatically switches from the wireless routing device to the access point device.

It should be noted that in this embodiment of the present disclosure, the wireless routing device is a mobile access point, the access point device is a fixed access point, and a method for automatic switching of the terminal between the access points is illustrated. Certainly, it can be understood that, switching of a terminal between mobile access points can also be implemented by using the idea of this embodiment of the present disclosure.

Figure 2:
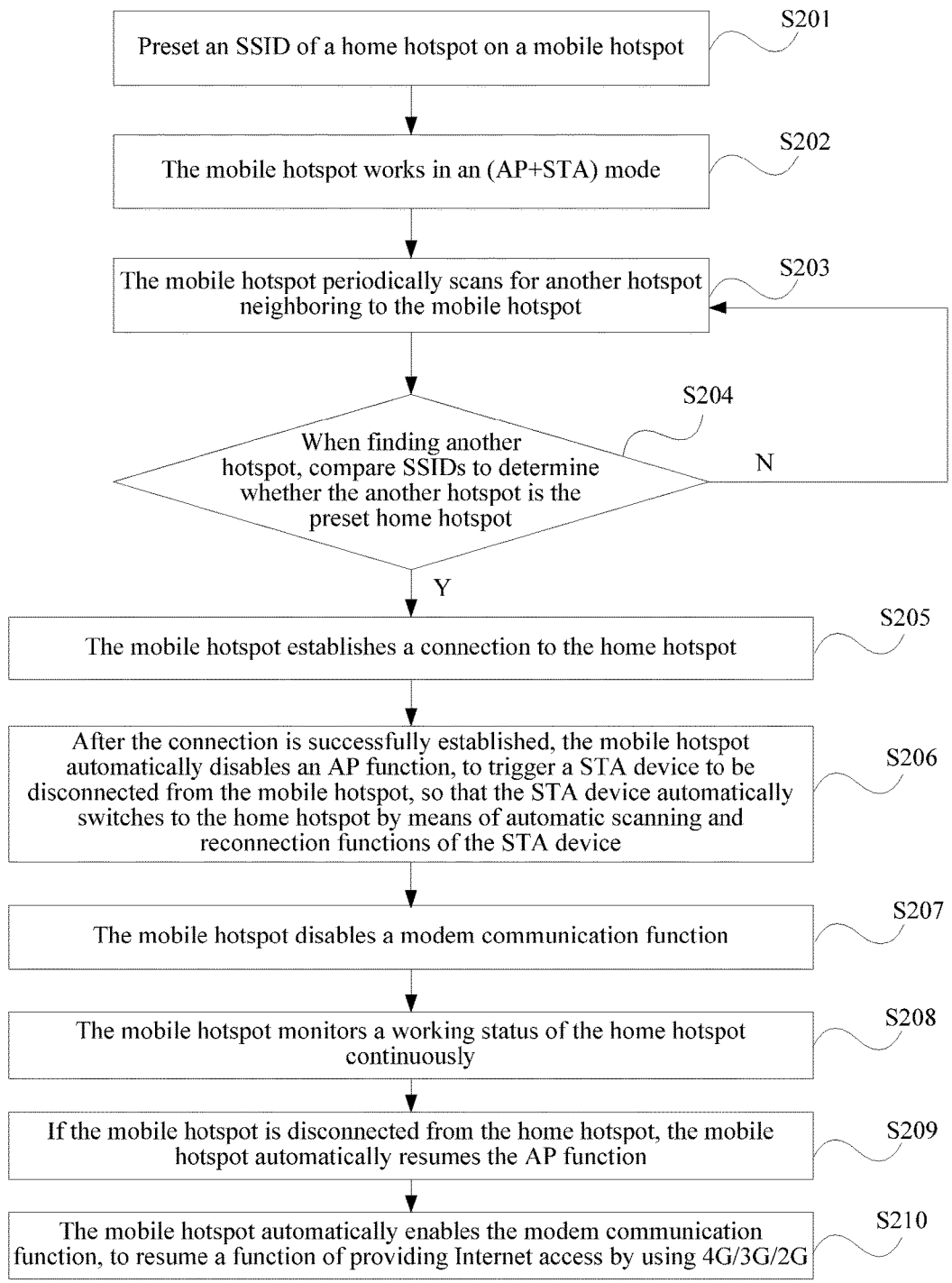
FIG. 2 is a flowchart of Embodiment 2 of a method for automatic switching between access points according to the present disclosure.

FIG. 2 is a flowchart of Embodiment 2 of a method for automatic switching between access points according to the present disclosure. In this embodiment, that a wireless routing device is a mobile hotspot and an access point device is a home hotspot is used as an example for description. As shown in FIG. 2, the method in this embodiment may include the following steps.

S201, Preset an SSID of the home hotspot on the mobile hotspot.

S202, The mobile hotspot works in an AP+STA mode.

The AP+STA mode is the access point AP function plus station STA function mode in Embodiment 1 of the present disclosure. That is, the mobile hotspot can scan for and connect to another hotspot device, and can establish a connection to a STA device and manage the STA device. The STA device may be a mobile phone, a tablet computer, or the like. The AP+STA mode may also be referred to as a WiFi offload mode. The mobile hotspot in the AP+STA mode has both an AP function plus a STA function. The AP function means that the mobile hotspot can be found by and connected to another device, and the STA function means that the mobile hotspot can scan for and connect to another hotspot.

S203, The mobile hotspot periodically scans for another hotspot neighboring to the mobile hotspot.

S204, When finding another hotspot, compare SSIDs to determine whether the another hotspot is the preset home hotspot. If the another hotspot is the preset home hotspot, S205 is performed. Otherwise, S203 is performed.

S205, The mobile hotspot establishes a connection to the home hotspot.

A connection establishment process is automatically initiating, by the mobile hotspot, a WiFi connection request message to the home hotspot, and returning, by the home hotspot, a WiFi connection response message to the mobile hotspot.

Further, secondary auxiliary identification may be performed by using a DHCP option 125 field. The mobile hotspot adds a DHCP option 125 field to a DHCP discover message. After receiving a DHCP offer message from the home hotspot, the mobile hotspot checks an option 125 field in the DHCP offer message. If the two fields are consistent, the mobile hotspot continues to connect to the home hotspot; otherwise, discards the home hotspot and continues to scan for/try another hotspot. In this manner, a mobile router automatically connects to only a home router of a specified vendor, ensuring a more secure access.

S206, After the connection is successfully established, the mobile hotspot automatically disables an AP function, to trigger a STA device to be disconnected from the mobile hotspot, so that the STA device automatically switches to the home hotspot by means of automatic scanning and reconnection functions of the STA device.

In addition to the manner of "disabling an AP function", access of the STA device may be controlled by first sending a "de-associate" message and then hiding an SSID and not responding to an access request of the STA device.

S207, The mobile hotspot disables a modem communication function.

That is, the mobile hotspot disconnects from a wireless wide area network such as 3GPP or 3GPP2, so as to reduce power consumption and prolong a service time of the mobile hotspot.

S208, The mobile hotspot monitors a working status of the home hotspot continuously.

The mobile hotspot monitors the working status of the home hotspot continuously by maintaining a WiFi connection to the home hotspot. That is, the mobile hotspot works in a STA mode. In the STA mode, the mobile hotspot has only the STA function. The STA mode is the STA mode in Embodiment 1 of the present disclosure.

S209, If the mobile hotspot is disconnected from the home hotspot, the mobile hotspot automatically resumes the AP function.

Once the mobile hotspot detects that the mobile hotspot is disconnected from the home hotspot (for example, the home hotspot cannot work normally and passively disrupts the connection, the home hotspot disconnects from the mobile hotspot because an upper access limit is reached, the home hotspot disconnects from the mobile hotspot because load is limited, a data link is unavailable for a long time and the mobile hotspot proactively disrupts the connection, or the mobile hotspot moves into an area that cannot be covered by the home hotspot and proactively disrupts the connection), the mobile hotspot automatically resumes the AP function, that is, switches back to the AP+STA mode, namely, the offload mode. In this case, the STA device can automatically find and connect to the mobile hotspot again.

S210, The mobile hotspot automatically enables the modem communication function, to resume a function of providing Internet access by using 4G/3G/2G.

In this embodiment, a mobile hotspot periodically scans for another hotspot neighboring to the mobile hotspot, and when finding another hotspot, determines, according to an SSID of the hotspot, whether the hotspot is a preset home hotspot. If the hotspot is the home hotspot, the mobile hotspot establishes a connection to the home hotspot, and disconnect from a STA device, so that the STA device automatically reconnects to the home hotspot. In this way, the STA device can automatically switch from the mobile hotspot to the home hotspot. That is, the STA device can implement automatic switching within a coverage area of a wireless local area network at home. Further, when the STA device establishes a connection to the home hotspot for communication, the mobile hotspot also establishes a connection to the home hotspot, so as to monitor the home hotspot continuously. When the mobile hotspot is disconnected from the home hotspot, an AP function of the mobile hotspot can be resumed. In this way, the STA device can automatically find and connect to the mobile hotspot again. Therefore, the STA device can still implement automatic switching when outside the coverage area of the wireless local area network at home. In conclusion, according to the method in this embodiment, the STA device can automatically switch between the mobile hotspot and the home hotspot.

A mobile access point may proactively control a terminal to implement automatic switching of the terminal, the mobile access point monitors and identifies a fixed access point continuously to effectively control switching of the terminal, and when the fixed access point becomes abnormal, the mobile access point can be used as a standby access point, so that the terminal can continue to communicate with a network by using the access point.

Figure 3:
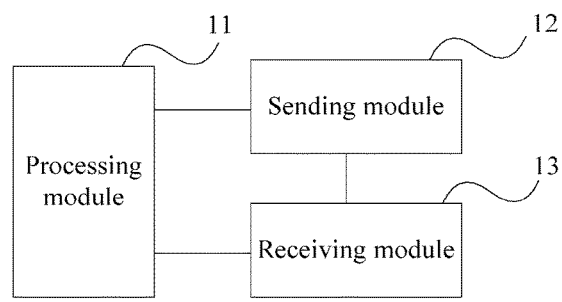
FIG. 3 is a schematic structural diagram of Embodiment 1 of a wireless routing device according to the present disclosure.

FIG. 3 is a schematic structural diagram of Embodiment 1 of a wireless routing device according to the present disclosure. As shown in FIG. 3, when the wireless routing device has established a network connection to a terminal, the apparatus in this embodiment may include a processing module 11, a sending module 12, and a receiving module 13. The processing module 11 is configured to determine whether an access point device allowing access exists within a wireless connection range of the wireless routing device. The sending module 12 is configured to if the access point device exists, send a wireless connection request message to the access point device, to establish a network connection to the access point device. The processing module 11 is further configured to disrupt the network connection to the terminal, to trigger the terminal to connect to the access point device, so that the terminal accesses the Internet by using the access point device.

Further, that the processing module 11 is configured to determine whether an access point device allowing access exists within a wireless connection range of the wireless routing device includes working, by the processing module 11, in an access point AP function plus station STA function mode, periodically scanning for an access point device by using the STA, obtaining a service set identifier of the found access point device, and comparing the service set identifier of the access point device with an access point device service set identifier set stored in the access point device, to determine whether the access point device is the access point device allowing access; and if the service set identifier of the access point device is in the service set identifier set stored in the access point device, determining that the access point device is the access point device allowing access. The service set identifier set stored in the access point device includes a service set identifier of at least one access point device.

The sending module 12 is further configured to send a DHCP discover message to the access point device. The DHCP discover message carries a first DHCP option field. The receiving module 13 is configured to receive a DHCP suggestion message returned by the access point device. The DHCP suggestion message carries a second DHCP option field. The processing module 11 is further configured to compare the first DHCP option field with the second DHCP option field, and if the first DHCP option field is consistent with the second DHCP option field, establish the connection to the access point device.

Further, that the processing module 11 is configured to disrupt the network connection to an access device includes stopping wirelessly communicating with the terminal; or sending a de-associate message to the terminal, and hiding a service set identifier of the wireless routing device.

Further, the processing module 11 of the wireless routing device in this embodiment is further configured to disrupt a connection a wireless wide area network.

Optionally, the processing module 11 is further configured to after disrupting the network connection to the terminal, switch from the access point AP function plus station STA function mode to a station STA function mode; and the wireless routing device monitors the access point device continuously in the station STA mode.

Further, that the processing module 11 is configured to monitor, by the wireless routing device, the access point device continuously in the station STA function mode may be if the processing module 11 detects that the wireless routing device is disconnected from the access point device, switching back to the access point AP function plus station STA function mode to reestablish a network connection to the terminal.

The apparatus in this embodiment may be configured to execute the technical solution in the method embodiment shown in FIG. 1 or FIG. 2. The implementation principles and technical effects thereof are similar. Details are not described herein again.

Figure 4:
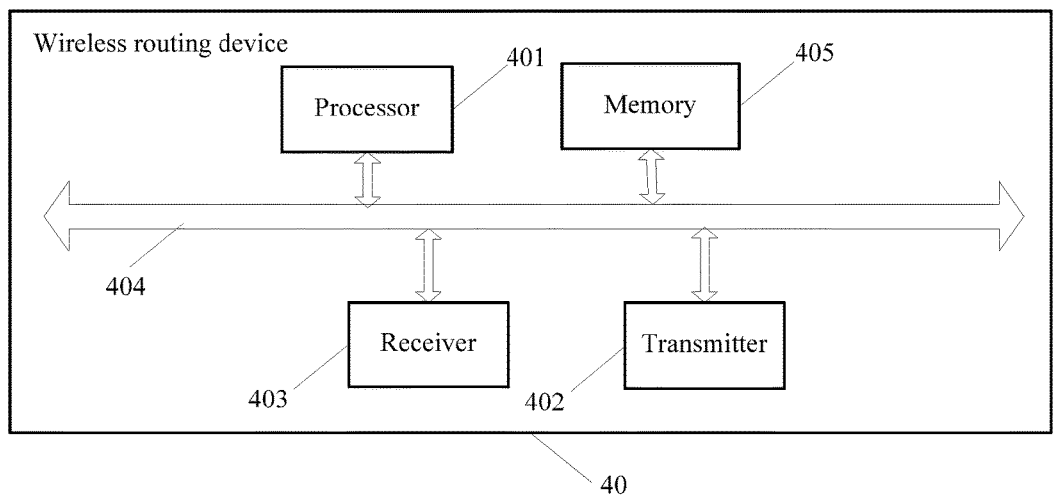
FIG. 4 is a schematic structural diagram of Embodiment 2 of a wireless routing device according to the present disclosure.

FIG. 4 is a schematic structural diagram of Embodiment 2 of a wireless routing device according to the present disclosure. As shown in FIG. 4, the wireless routing device 40 provided in this embodiment includes a processor 401, a transmitter 402, a receiver 403, a bus 404, and a memory 405. The bus 404 is configured to connect the processor 401, the transmitter 402, the receiver 403, and the memory 404, and transmit information. The memory 405 stores an execution instruction. When the wireless routing device 40 operates, the processor 403 communicates with the memory 404, the processor 403 runs code stored in the memory 404, to perform the following operations when the wireless routing device has established a network connection to a terminal, determining whether an access point device allowing access exists within a wireless connection range of the wireless routing device; if the access point device exists, sending a wireless connection request message to the access point device by using the transmitter 402, to establish a network connection to the access point device; and disrupting the network connection to the terminal, to trigger the terminal to connect to the access point device, so that the terminal accesses the Internet by using the access point device.

Further, that the processor 403 is configured to determine whether an access point device allowing access exists within a wireless connection range of the wireless routing device includes in an access point AP function plus station STA function mode, periodically scanning, by the processor, for an access point device by using the STA function, obtaining a service set identifier of the found access point device, and comparing the service set identifier of the access point device with an access point device service set identifier set stored in the access point device, to determine whether the access point device is the access point device allowing access; and if the service set identifier of the access point device is in the service set identifier set stored in the access point device, determining that the access point device is the access point device allowing access.

The service set identifier set stored in the access point device includes a service set identifier of at least one access point device.

Further, the transmitter 402 is further configured to before the network connection to the access point device is established, send a DHCP discover message to the access point device. The DHCP discover message carries a first DHCP option field.

The receiver 403 is further configured to receive a DHCP suggestion message returned by the access point device. The DHCP suggestion message carries a second DHCP option field.

The processor 401 is further configured to compare the first DHCP option field with the second DHCP option field, and if the first DHCP option field is consistent with the second DHCP option field, establish the connection to the access point device.

That the processor 401 is configured to disrupt the network connection to the terminal includes stopping wirelessly communicating with the terminal; or sending a de-associate message to the terminal by using the transmitter 402, and hiding a service set identifier of the wireless routing device.

The processor 401 is further configured to disconnect from a wireless wide area network after disrupting the network connection to the terminal.

The processor 401 is further configured to after disrupting the network connection to the terminal, switch from the access point AP function plus station STA function mode to a station STA function mode; and monitor, by the processor 401, the access point device continuously in the station STA mode.

That the processor 401 is configured to monitor the access point device continuously in the station STA mode may be if the processor detects that the wireless routing device is disconnected from the access point device, switching back to the access point AP function plus station STA function mode to reestablish a network connection to the terminal.

The device in this embodiment may be configured to execute the technical solutions in the method embodiments. The implementation principles and technical effects thereof are similar. Details are not described herein again.

It should be noted that in this embodiment of the present disclosure, the receiver 403 may correspond to a transceiver of the wireless routing device, the transmitter 402 may also correspond to the transceiver of the wireless routing device, and the processor 401 may be a central processing unit (CPU), or an application-specific integrated circuit (ASIC), or one or more integrated circuits for implementing this embodiment of the present disclosure.

In the several embodiments provided in the present disclosure, it should be understood that the disclosed apparatus and method may be implemented in other manners. For example, the described apparatus embodiment is only an example. For example, the unit division is only logical function division and may be other division in other embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. The foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are only intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for automatic switching between access points, wherein the method comprises:
    sending, by a wireless routing device, a Dynamic Host Configuration Protocol (DHCP) discover message to an access point device, wherein the DHCP discover message comprises a first DHCP option field;
    receiving, by the wireless routing device, a DHCP suggestion message from the access point device, wherein the DHCP suggestion message comprises a second DHCP option field;
    comparing, by the wireless routing device, the first DHCP option field with the second DHCP option field;
    sending, by the wireless routing device, a wireless connection request message to the access point device to establish a network connection to the access point device when the access point device is within a wireless connection range of the wireless routing device and when the first DHCP option field is consistent with the second DHCP option field; and
    disrupting, by the wireless routing device, a network connection to a terminal by sending a de-associate message to the terminal to trigger the terminal to connect to the access point device.

2. The method of claim 1, wherein determining whether the access point device allowing access exists within the wireless connection range comprises:
    working, by the wireless routing device, in an access point (AP) function plus station (STA) function (AP+STA) mode;
    scanning, periodically by the wireless routing device, for the access point device by using a STA;
    obtaining a service set identifier of the access point device; and
    comparing the service set identifier (SSID) of the access point device with a stored access point device SSID set stored in the access point device to determine whether the access point device is allowing access; and
    determining that the access point device is allowing access when the SSID of the access point device is in the SSID set stored in the access point device.

3. The method of claim 1, wherein disrupting the network connection to the terminal comprises one of:
    stopping, by the wireless routing device, wirelessly communicating with the terminal; and
    hiding, by the wireless routing device, a SSID of the wireless routing device.

4. The method of claim 1, wherein after disrupting the network connection to the terminal, the method further comprises disconnecting, by the wireless routing device, from a wireless wide area network.

5. The method of claim 1, wherein after disrupting the network connection to the terminal, the method further comprises:
    switching, by the wireless routing device, from an access point (AP) function plus station (STA) function (AP+STA) mode to a STA mode; and
    monitoring, by the wireless routing device, the access point device continuously in the STA mode.

6. The method of claim 5, wherein monitoring the access point device continuously in the STA mode comprises: switching, by the wireless routing device, back to the AP+STA mode to reestablish the network connection to the terminal when the wireless routing device detects that the wireless routing device is disconnected from the access point device.

7. A wireless routing device configured to establish a network connection to a terminal, wherein the wireless routing device comprises:
    a transmitter configured to:
    send a Dynamic Host Configuration Protocol (DHCP) discover message to an access point device before the wireless routing device has established a network connection to the access point device, wherein the DHCP discover message comprises a first DHCP option field;
    a receiver coupled to the transmitter and configured to receive a DHCP suggestion message from the access point device, wherein the DHCP suggestion message comprises a second DHCP option field; and
    a processor coupled to the transmitter and receiver and configured to:
    compare the first DHCP option field with the second DHCP option field;
    establish the network connection to the access point device when the transmitter has sent a wireless connection request message to the access point device, when the access point device is within a wireless connection range of the wireless routing device, and when the first DHCP option field is consistent with the second DHCP option field; and
    disrupt the network connection to the terminal by sending a de-associate message to the terminal to trigger the terminal to connect to the access point device.

8. The wireless routing device of claim 7, wherein the processor configured to determine whether the access point device allowing access exists within the wireless connection range comprises the processor configured to:
    function in an access point (AP) function plus station (STA) function (AP+STA) mode;
    scan, periodically, for the access point device by using a STA;
    obtain a service set identifier (SSID) of the access point device; and
    compare the SSID of the access point device with a stored access point device SSID set stored in the access point device to determine whether the access point device is allowing access; and
    determine that the access point device is the access point device allowing access when the SSID of the access point device is in the SSID set stored in the access point device.

9. The wireless routing device of claim 7, wherein the processor configured to disrupt the network connection to the terminal comprises the processor configured to:
    stop wirelessly communicating with the terminal; or
    hide a SSID of the wireless routing device.

10. The wireless routing device of claim 7, wherein the processor is further configured to disconnect from a wireless wide area network after disrupting the network connection to the terminal.

11. The wireless routing device of claim 7, wherein the processor is further configured to:
  switch from an access point (AP) function plus station (STA) function (AP+STA) mode to a STA mode; and
  monitor the access point device continuously in the STA mode.

12. The wireless routing device of claim 11, wherein the processor configured to monitor the access point device continuously in the STA mode comprises the processor configured to switch back to the AP+STA mode to reestablish the network connection to the terminal when the processor detects that the wireless routing device is disconnected from the access point device.

13. An apparatus comprising at least one processor and at least one memory, wherein the at least one memory comprises instructions that when executed by the at least one processor cause the apparatus to:
  send a Dynamic Host Configuration Protocol (DHCP) discover message to an access point device, wherein the DHCP discover message comprises a first DHCP option field;
  receive a DHCP suggestion message from the access point device, wherein the DHCP suggestion message comprises a second DHCP option field;
  compare the first DHCP option field with the second DHCP option field;
  send a wireless connection request message to the access point device to establish a network connection to the access point device when the access point device is within a wireless connection range of a wireless routing device;
  establish the network connection to the access point device when the first DHCP option field is consistent with the second DHCP option field; and
  disrupt a network connection to a terminal by sending a de-associate message to the terminal to trigger the terminal to connect to the access point device when the access point device is within the wireless connection range.

14. The apparatus of claim 13, wherein the instructions further cause the processor to determine whether the access point device allowing access exists within the wireless connection range by:
  working, by the wireless routing device, in an access point (AP) function plus station (STA) function (AP+STA) mode;
  scanning, periodically by the wireless routing device, for the access point device by using a STA;
  obtaining a service set identifier of the access point device; and
  comparing the service set identifier (SSID) of the access point device with a stored access point device SSID set stored in the access point device to determine whether the access point device is allowing access; and
  determining that the access point device is allowing access when the SSID of the access point device is in the SSID set stored in the access point device.

15. The apparatus of claim 13, wherein the instructions further cause the processor to disrupt the network connection to the terminal by:
  stopping wirelessly communicating with the terminal; and
  hiding a SSID of the wireless routing device.

16. The apparatus of claim 13, wherein after disrupting the network connection to the terminal, the instructions further cause the processor to disconnect from a wireless wide area network.

17. The apparatus of claim 13, wherein after disrupting the network connection to the terminal, the instructions further cause the processor to:
  switch from an access point (AP) function plus station (STA) function (AP+STA) mode to a STA mode; and
  monitor the access point device continuously in the STA mode.

* * * * *